J. MELVIN.
SIGNALING APPARATUS.
APPLICATION FILED AUG. 6, 1908.
922,014.
Patented May 18, 1909.
2 SHEETS—SHEET 1.
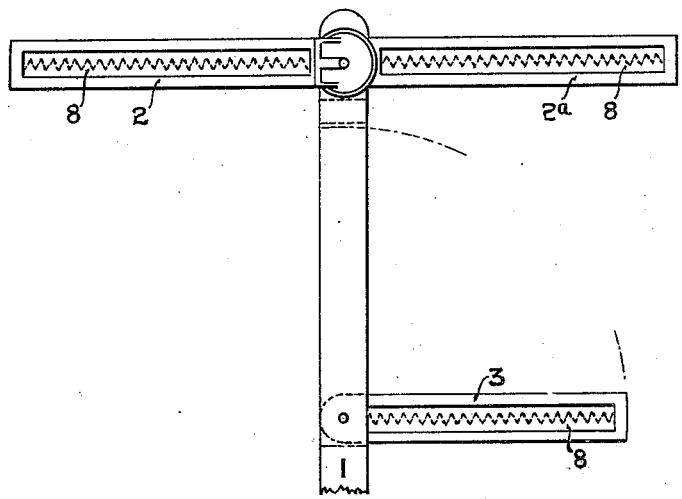
FIG:1
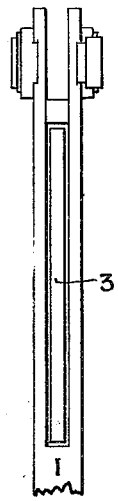
FIG:2
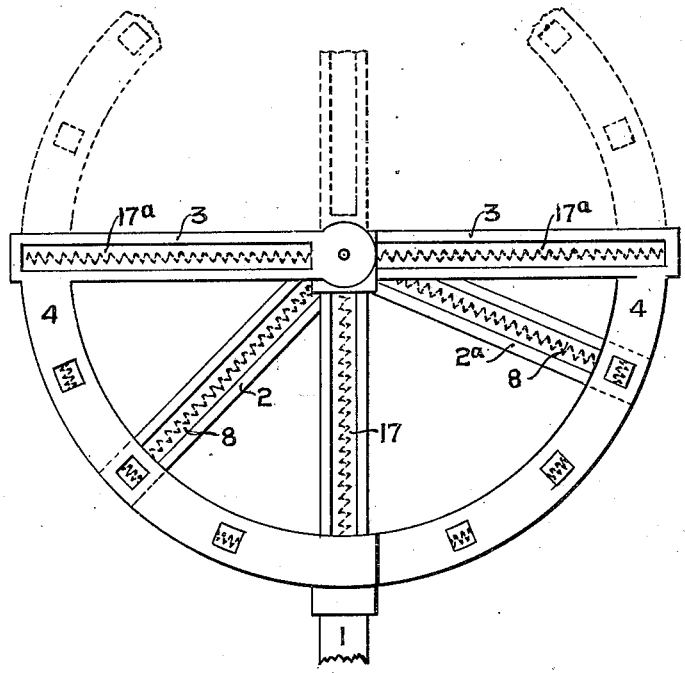
FIG:3
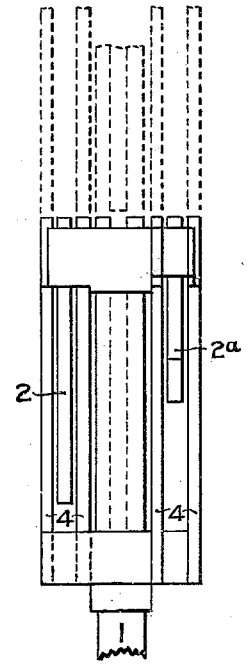
FIG:4
WITNESSES
INVENTOR J. MELVIN.
SIGNALING APPARATUS.
APPLICATION FILED AUG. 6, 1908.
922,014.
Patented May 18, 1909.
2 SHEETS—SHEET 2.
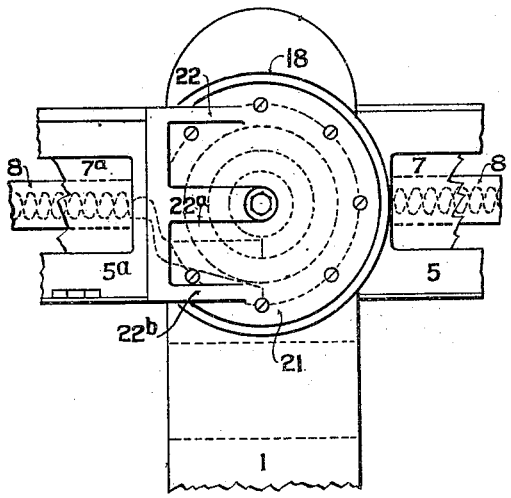
FIG:5
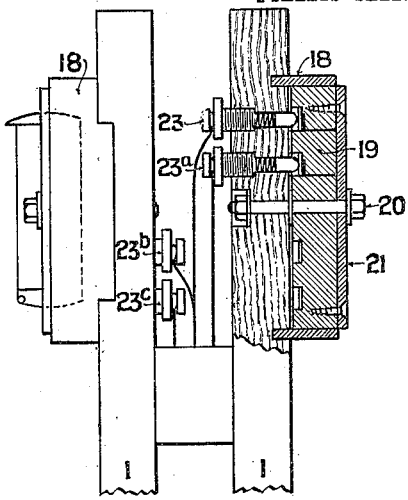
FIG:6
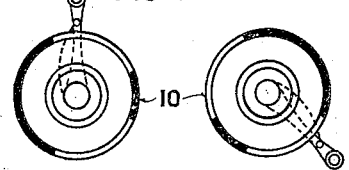
FIG:7  FIG:8
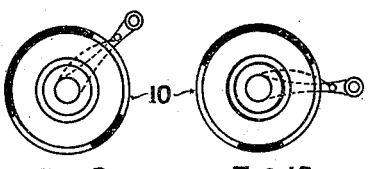
FIG:9  FIG:10
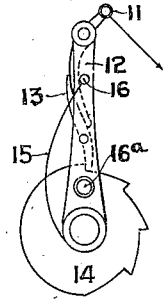
FIG:11
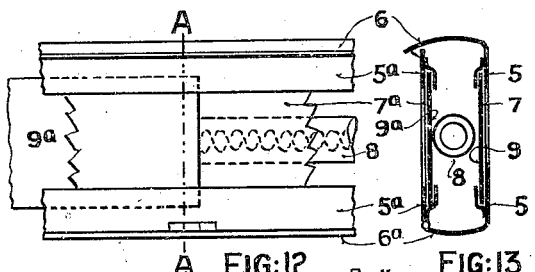
FIG:12   FIG:13
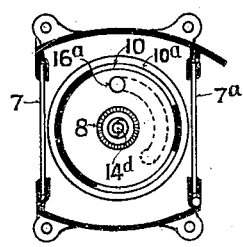
FIG:14
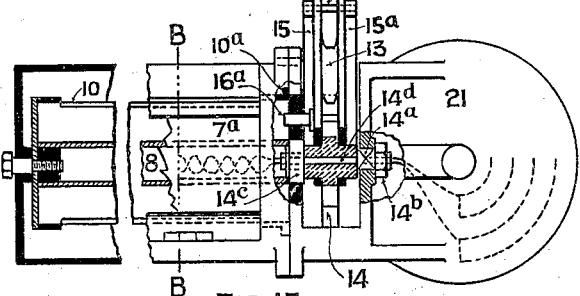
FIG:15
WITNESSES
W. P. Burke
A. F. Heuman
INVENTOR
John Melvin
Wm Wallace White
ATTY

UNITED STATES PATENT OFFICE.

JOHN MELVIN, OF TOOWOOMBA, QUEENSLAND, AUSTRALIA.

SIGNALING APPARATUS.

No. 922,014.   Specification of Letters Patent.   Patented May 18, 1909.

Application filed August 6, 1908. Serial No. 447,254.

*To all whom it may concern:*

Be it known that I, JOHN MELVIN, a subject of the King of the United Kingdom of Great Britain and Ireland, and resident of Margaret street, Toowoomba, in the State of Queensland, Commonwealth of Australia, have invented certain new and useful Improvements in Signaling Apparatus, of which the following is a specification.

This invention relates to improvements in signaling apparatus, its object being to provide a more reliable system of signaling at night on board ships, more especially on board war vessels, by the use of semaphores the same as during daylight: and consists in illuminating the arms by electricity, said arms being constructed of box frames, provided with glazed openings for displaying the light, which is supplied from electric current from any convenient source and may be either constant or intermittent.

The indicating arm for indicating the operation of either the port or starboard semaphore arm as now used, I also illuminate and I may employ fixed to the post vertical and horizontal lines of light, and lights arranged in an arc.

Different colored transparent material may be used for distinguishing the separate arms.

All the lights are glazed with non-radiating material, providing a luminous glow, a valuable feature of the invention: shutters are also provided to the lights for screening the same in either fore or aft direction as desired, thus preventing the signals being read in more than one direction, an advantage the day semaphores do not possess.

I may mount the semaphore mast upon a pivot to enable the same to be revolved and the signals read from any direction.

Reference is now made to the drawings in which—

Figure 1 is a front elevation of semaphore with arms extended. Fig. 2 is a side elevation of semaphore with indicator arm obscured. Fig. 3 is a front elevation of semaphore with fixed arms and arc and movable arms. Fig. 4 is a side elevation of same. Fig. 5 is a front elevation of commutator and broken view of arms and semaphore mast to enlarged scale. Fig. 6 is a side elevation of same partly in section. Figs. 7 to 10 are sections of revolving shutter showing same open and closed. Fig. 11 is a detail to enlarged scale of ratchet fixed to commutator on which revolve the levers actuating the shutter. Fig. 12 is a part front elevation to enlarged scale of arm showing sliding shutter. Fig. 13 is a section on line A—A. Figs. 14 and 15 are details showing position of ratchet and levers for revolving shutter.

The reference numerals indicate corresponding parts in all figures.

1 is the semaphore mast terminating at its top and in a fork as shown in Fig. 6.

2 and $2^a$ are the signaling arms and 3 the indicator arm which may be movable as shown in Fig. 1 or fixed and integral with an arc 4 as shown in Fig. 3.

The arms are constructed of brass plates 5 and $5^a$ connected to or formed integrally with roof and base plate 6 and $6^a$, forming a box frame, the side plate $5^a$ is hinged at bottom to afford access to the interior.

Mounted within the box frames are incandescent electric tubes 8, which are visible through light openings provided in the frames, these openings are glazed with any approved non-radiating but luminous material, such as ground glass, horn, mica, or similar substances indicated by numerals 7 and $7^a$.

The arms are provided with shutters 9 and $9^a$ sliding in grooves see Fig. 13 or revolving shutters 10 see Figs. 7 to 10 for screening the light in any direction, these shutters are polished on the inside for reflecting the light.

Fig. 7 shows the revolving shutter screening the light entirely, Fig. 8 in one direction, Fig. 9 in the opposite direction and Fig. 10 light fully exposed. The shutters are operated by a lanyard attached to the end of a trigger 11 pivoted between the plates of a double lever 12 and $12^a$ between which is also pivoted a spring pawl 13 which engages with the teeth of a ratchet 14, fixed to the commutator: 15 is a spring coiled round the shutter spindle and fastened with a stud 16 to the lever arms 12 and $12^a$, this spring exerts a backward pressure against the lever arms, which with the strain on the trigger sufficient to keep the pawl disengaged, would permit the levers to return to starting point as shown in Fig. 7, after having been pulled round through the positions as shown in Figs. 9, 10 and 8.

Figs. 14 and 15 show the revolving shutter and the mechanism actuating same. 14 is a ratchet having four teeth spaced at certain intervals, this ratchet is furnished with a square neck 14$^a$ at its junction with the end of the arms 21 to which it is secured by a nut 14$^b$, the opposite end of the ratchet is furnished with a screwed collar 14$^c$, and through the center of the ratchet is a hole 14$^d$ through which passes the electric wires from commutator to incandescent tube 8. The revolving shutter is fastened at the outer end of the movable arms by an insulated pin upon which it revolves, the other end revolves upon the circular collar 14$^c$ and also in a circular recess formed in the commutator, 10$^a$ is a collar forming a shoulder. 16$^a$ is a pin fixed to the levers 12 and 12$^a$ engaging with a hole in the end of the revolving shutter by which it is actuated, the levers 12 and 12$^a$ make a partial revolution on the fixed ratchet, in a suitable slot on the end of the commutator. The dotted lines shown in Fig. 14 illustrate the travel of the pin only and is not a slot. The fixed arc consists of two quadrants fixed to the semaphore mast and carries the fixed horizontal arms integral therewith, and each quadrant consists of two limbs both of which are illuminated and visible fore and aft, between which the movable arms work. The arcs of each quadrant are illuminated at three points say at angles of $22\frac{1}{2}°-45°$ and $67\frac{1}{2}°$ whereby the signals can be easily read according to the angle assumed by the moving arms; the arc may be carried upward as shown in dotted lines forming a complete circle and shutters may be provided for screening the light. 17 is an incandescent tube sunk in the semaphore mast at right angles to the illuminated fixed arms, whereby in the case of a ship rolling, the relative position of the movable semaphore arms to the vertical line of the semaphore mast is readily ascertained. In the forked end of the semaphore mast is a groove for receiving a metal ring or collar 18 within which rotates the commutator 19 upon central bolt 20. The end 21 of the semaphore arms are screwed on to the commutator and provided with strengthening webs 22, 22$^a$ and 22$^b$. 17$^a$ is an incandescent tube in the fixed arms. 23, 23$^a$, 23$^b$, and 23$^c$ are contact studs and springs, which engage with the metallic rings of the commutators, establishing electrical connection.

Any well known means of wiring may be used with necessary switches, providing for a constant or intermittent current, by which any of the lights can be cut off at will.

In using colored lights for port and starboard I prefer to adopt a pink to a red light, being more penetrating and discernible at a greater distance.

Having now described my invention, what I claim as new and desire to secure by Letters Patent is:—

1. In improvements in signaling apparatus the combination of movable illuminated box framed arms, side plates on one side of said arms hinged to the box frame, non-radiating glazed openings in said plates, shutters fitted to said frames for screening the light, commutators rotating upon bolts in the forked head of the semaphore mast, said box frames secured to commutators, contact studs and springs fixed to the head of semaphore mast, connected by wires to an electric battery or other electrical source as herein described and illustrated by drawings.

2. In improvements in signaling apparatus the combination of movable illuminated box framed arms, working between illuminated double arms and arcs fixed to a semaphore mast, non-radiating glazed openings in movable and fixed arms and arcs, a vertical incandescent tube fitted to semaphore mast and shutters for screening the lights as herein described and illustrated by drawings.

3. In improvements in signaling apparatus the combination of the illuminated arms of a semaphore and non-radiating material covering the light openings in said arms, as and for the purpose set forth and as herein described.

In witness whereof I have hereunto set my hand in presence of two witnesses.

JOHN MELVIN.

Witnesses:
  C. W. HAMILTON,
  C. A. HAMILTON.